(12) United States Patent
Puel et al.

(10) Patent No.: US 12,470,167 B2
(45) Date of Patent: Nov. 11, 2025

(54) METHOD FOR CONTROLLING A TRACKING DEVICE FOR MAXIMIZING THE CURRENT PRODUCED BY A BIFACIAL PHOTOVOLTAIC SOLAR MODULE WITH MULTI-JUNCTION CELLS

(71) Applicants: INSTITUT PHOTOVOLTAIQUE D'ILE DE FRANCE (IPVF), Palaiseau (FR); ELECTRICITE DE FRANCE, Paris (FR); TOTALENERGIES ONETECH, Courbevoie (FR); CENTRE NATIONAL DE LA RECHERCHE SCIENTIFIQUE-CNRS-, Paris (FR); ECOLE POLYTECHNIQUE, Palaiseau (FR)

(72) Inventors: Jean-Baptiste Puel, Paris (FR); Arthur Julien, Antony (FR)

(73) Assignees: INSTITUT PHOTOVOLTAIQUE D'ILE DE FRANCE (IPVF), Palaiseau (FR); ELECTRICITE DE FRANCE, Paris (FR); TOTALENERGIES ONETECH, Courbevoie (FR); CENTRE NATIONAL DE LA RECHERCHE SCIENTIFIQUE-CNRS-, Paris (FR); ECOLE POLYTECHNIQUE, Palaiseau (FR)

( * ) Notice: Subject to any disclaimer, the term of this patent is extended or adjusted under 35 U.S.C. 154(b) by 11 days.

(21) Appl. No.: 18/577,749
(22) PCT Filed: Jul. 5, 2022
(86) PCT No.: PCT/EP2022/068546
§ 371 (c)(1),
(2) Date: Jan. 9, 2024
(87) PCT Pub. No.: WO2023/280830
PCT Pub. Date: Jan. 12, 2023

(65) Prior Publication Data
US 2024/0322746 A1    Sep. 26, 2024

(30) Foreign Application Priority Data

Jul. 9, 2021 (FR) .................................. 2107515

(51) Int. Cl.
*H02S 20/32* (2014.01)
*H02S 40/36* (2014.01)
(Continued)

(52) U.S. Cl.
CPC .............. *H02S 20/32* (2014.12); *H02S 40/36* (2014.12); *H10F 10/142* (2025.01); *H10F 19/40* (2025.01)

(58) Field of Classification Search
CPC ........ H02S 20/32; H02S 40/36; H10F 10/142; H10F 19/40
See application file for complete search history.

(56) References Cited

U.S. PATENT DOCUMENTS

2013/0056614 A1* 3/2013 Balachandreswaran ..................... G01J 1/0242
250/203.4

FOREIGN PATENT DOCUMENTS

| CN | 108347221 A | 7/2018 |
| CN | 111474962 A | 7/2020 |

OTHER PUBLICATIONS

International Search Report, issued Aug. 18, 2022, in corresponding International Application No. PCT/EP2022/068546, 9 pages.
(Continued)

*Primary Examiner* — Tae-Sik Kang
(74) *Attorney, Agent, or Firm* — Maier & Maier, PLLC (57) ABSTRACT

A method for maximizing the current produced by a bifacial photovoltaic solar module including a plurality of cells, each having at least two stacked and series-connected junctions, the module being capable of orientation and including a device for driving its orientation with respect to the sun. The (Continued)

method includes an algorithm including measuring the module's irradiance at the upper face (Ai) on its upper photoactive face, reflective irradiance (Ar) on its lower photoactive face in its initial orientation, and initial current I from the irradiances Ai and Ar, and calculating currents Ijg generated by the stacked junctions from the cells' physical characteristics and I, calculating an optimized theoretical orientation for which equalization and maximization of the theoretical currents Ijtmax is obtained, and positioning the module in the theoretical orientation when an imbalance between Ijtmax and Ijg is greater than a threshold value dIjmax. A module designed for this method.

14 Claims, 7 Drawing Sheets

(51) Int. Cl.
    *H10F 10/142* (2025.01)
    *H10F 19/40* (2025.01)

(56) References Cited

OTHER PUBLICATIONS

XP055898553; Stein, et al., "Bifacial Photovoltaic Modules and Systems: Experience and Results from International Research and Pilot Applications 2021 PVPS"Report IEA-PVPS, Apr. 2021, pp. 1-167, 168 pages.

XP033964944; Gostein, et al., "Measuring Irradiance for Bifacial PV Systems", 2021 IEEE 48th Photovoltaic Specialists Conference (PVSC), IEEE, Jun. 20, 2021, 8 pages.

XP055899107; Onno, et al., "Predicted Power Output of Silicon-Based Bifacial Tandem Photovoltaic Sysems", JOULE, vol. 4, No. 3, Mar. 2020, pp. 580-596, 18 pages.

XP55200698; Asadpour, et al., "Bifacial Si heterojunction-perovskite organic-inorganic tandem to produce highly efficient (&eegr;T* &sim 33%) solar cell", Applied Physics Letters, vol. 106, No. 24, Jun. 15, 2015, 5 pages.

XP055593622; Schmager, et al., "Methodology of energy yield modelling of perovskite-based multi-junction photovoltaics", Optics Express, vol. 27, No. 8, Apr. 3, 2019, pp. A507-A523, 17 pages.

XP011815338; Pal, et al., "Simulation of Bifacial and Monofacial Silicon Solar Cell Short-Circuit Current Density Under Measured Spectro-Angular Solar Irradiance", IEEE Journal of Photovoltaics, IEEE, vol. 10, No. 6, Nov. 2020, pp. 1803-1815, 13 pages.

XP055898382; Julien, et al., "Backside light management of 4-terminal bifacial perovskite/silicon tandem PV modules evaluated under realistic conditions", Optics Express, vol. 28, No. 25, Nov. 20, 2020, p. 37487, 18 pages.

XP029505346; Guerrero-Lemus, et al., "Bifacial Solar Photovoltaics—A technology review", Renewable and Sustainable Energy Reviews, Elseviers Science, New York, NY, US. vol. 60, Mar. 24, 2016, pp. 1533-1549, 17 pages.

\* cited by examiner

METHOD FOR CONTROLLING A TRACKING DEVICE FOR MAXIMIZING THE CURRENT PRODUCED BY A BIFACIAL PHOTOVOLTAIC SOLAR MODULE WITH MULTI-JUNCTION CELLS

FIELD

The invention falls within the field of renewable photovoltaic energy. The invention relates to a method, a photovoltaic panel, and a solar tracking device (tracker) designed to maximize the current produced by one or more bifacial multi-junction photovoltaic modules in a device for producing energy using photovoltaic panels.

Bifacial photovoltaic modules with tandem-type junctions are based on the pairing of two stacked, series-connected photovoltaic junctions. In such a case, for optimal functioning, the two junctions must produce the same quantity of current. When the lower junction is bifacial, it produces current according to two contributions, the light received at the front face of the module and crossing the top junction without being converted by the latter, and the light received at the rear face of the module. The ratio of light contributions at the front and rear faces depends on the orientation of the module.

Tandem cells are a specific example of multi-junction cells with two junctions and it is also possible to manufacture bifacial modules by means of multi-junction cells with more than two junctions that will receive light on the upper face of the module and light on the lower face.

Multi-junction cells comprise stacked junctions in different semiconductor materials with decreasing band gaps from an upper face of a module to convert parts of light with increasing wavelength in their successive layers, the lower layer also converting all the light arriving under the module. In a multi-junction cell, each junction produces current from a different part of the spectrum. Junctions absorbing long wavelengths also absorb shorter wavelengths, but the reverse is not true, also the junctions are stacked to absorb increasing wavelengths from the top of the stack under an upper face of a module, the lower junction receiving light from the bottom and receiving the highest wavelengths that had crossed the stack from the top.

In these different embodiments, the junctions are connected in series, which means that the current produced by the cell will be limited by the junction providing the least current.

BACKGROUND

Manufacturing solar tracking devices in which one or more photovoltaic panels, each comprising one or more modules grouping together a plurality of cells laid out in rows/columns on the module, are installed on a mechanical system enabling the real-time modification of their orientation and sun tracking, is known.

TECHNICAL PROBLEM

These known solutions enable the current produced by modules converting the light received at the upper face of the module to be maximized, but do not enable the current produced by a solar power plant utilizing photovoltaic modules with bifacial multi-junction cells; i.e., bifacial multi-junction modules, to be maximized. In fact, these solutions do not optimize the illumination of the lower face of the module since, as seen above in the case of junctions or elements of cells that are stacked and series-connected, the current produced by the assembly is limited by the element receiving the least light, the efficiency of the module is thus limited by the lack of illumination at the lower face of the module.

In fact, unlike photovoltaic modules with mono-facial cells that must preferably be oriented facing the sun, leading the tracking devices to only follow the path of the sun, the optimal orientation maximizing the production of energy of a tandem or multi-junction bifacial photovoltaic module must balance the production of current in the junctions of the stack or stacks. This optimal orientation depends on the perceived powers at the front and rear faces, which, in turn, will vary according to numerous parameters: position of the sun, brightness of the sky, albedo, environment. In addition, the spectral composition of these contributions plays a large role in the balance of current between different junctions of a same stack. The height of the sun in the sky causes the proportion between light available for the upper junction and light available for the lower junction to vary every day, which means that the optimal orientation of the modules continuously varies in a different manner than for modules with mono-facial cells or bifacial mono-junction cells.

For a bifacial multi-junction module, not only the perceived powers at the front and rear faces, but also the respective efficiencies of the stacked junctions and their contributions, influence this optimal orientation.

SUMMARY

In view of the prior art, the present application proposes optimizing the orientation of the modules to balance the contributions of elements of cells receiving light at the front face and those receiving light at the lower face.

More specifically, the present disclosure proposes a method for maximizing the current produced by a photovoltaic panel comprising one or more bifacial photovoltaic solar modules, said modules comprising a plurality of photovoltaic cells, each provided with at least two stacked and series-connected junctions, said panel being able to be oriented and comprising a device for driving its orientation with respect to the sun, the method comprising:
  a. measuring a front face irradiance Ai on an upper photoactive face of said panel and measuring a rear face irradiance Ar on a lower photoactive face of said panel in an initial orientation of the panel,
  b. measuring the initial current I produced by the panel in response to the front face Ai and rear face Ar irradiances and calculating the currents Ijg generated by said stacked junctions on the basis of the physical characteristics of the cells, said initial current, and front face and rear face irradiances,
  c. calculating an optimized theoretical orientation for which, knowing said measured irradiances Ai, Ar, the generated currents and the physical characteristics of the cells, equalization of the theoretical currents Ijtmax of the junctions of the cells is obtained,
  d. positioning the panel in said theoretical orientation in the case where an imbalance between said theoretical currents Ijtmax and said generated currents Ijg is greater than a threshold value dIjmax or maintaining the position of said panel in the case of a difference in current between said theoretical currents and said generated currents of less than said threshold value.

According to the method, equalization of the theoretical currents Ijtmax of the junctions of the cells leads to a maximization of generated currents.

The chosen threshold value will depend on the precision of the tracking system and the illumination conditions of the panels, and a threshold value such as a relative deviation of 10% or even 5% may be given as an idea, this value being refined during implementation of the system.

The method enables the irradiance differences between the upper face and the lower face of the panel to be adjusted to equalize and maximize the current produced by the junctions and thus the cells. It should be noted that the objective of the method is not to equalize the perceived irradiances on the two faces of the panel, but rather to adjust the irradiances to equalize and maximize said currents, which is not necessarily obtained by equalizing the perceived irradiances.

When the imbalance between said theoretical currents Ijtmax and said generated currents Ijg is less than said threshold value dIjmax, the method may comprise a scan of the positions of the panel around the theoretical position obtained, measuring the current produced by the panel in each of said positions, and a step of placing the panel in the position maximizing the current produced by the panel.

Therefore, optimization takes into account the real characteristics of the cells and enables the prediction of the orientation of the panel issued from the calculation to be refined.

As the measurement of the irradiance at the upper face is carried out by one or more upper sensors at said upper face of the panel and one or more lower sensors at said lower face of the panel, the method may comprise steps prior to implementation of the panel comprising a step of choosing the number of upper and lower sensors and a step of positioning the upper and lower sensor or sensors according to the shading conditions and uniformity of light perceived above and below the panel according to several tilts of the panel, so as to generate irradiance data appropriate for the calculation of said theoretical orientation.

In doing this, the number and position of the sensors are optimized.

The prior steps may comprise a positioning of sensors at areas with the highest irradiance variations, exclusive of shade, according to the orientation of the panel. The positioning enables a compromise to be found between minimizing shading and obtaining the information required for the calculation, as described above.

This maximizes the operational range of the method.

The present disclosure also relates to a photovoltaic panel configured for the implementation of the method described above, comprising one or more modules, the cells of which are bifacial multi-junction cells in which the junctions are connected in series.

According to a particular embodiment, the cells of the module or modules are interconnected along a series-parallel network.

The present disclosure also relates to a computer program comprising instructions for the implementation of part or all of the method described above when this program is executed by a processor.

The present disclosure also relates to a non-transitory computer-readable recording medium, on which said program is recorded.

Lastly, the present disclosure relates to a device for producing energy, comprising one or more photovoltaic panels associated with one or more frames provided with solar tracking systems, at least some of the panels comprising one or more irradiance sensors at the front and rear faces of at least some of the panels, the device also comprising a tracking computer connected to said sensors, said computer being configured to execute said program and drive the position of said plurality of panels so as to balance and maximize the currents of the junctions of the cells issued from the irradiance at the upper face Ai and the irradiance at the lower face Ar received by said panels.

The sensors may be associated by pairs of sensors at the front and rear faces of the panels on one or more of the panels and are disposed along median positions within the panels, or along peripheral positions on said panels, or around said panels.

BRIEF DESCRIPTION OF THE DRAWINGS

Other characteristics, details and advantages of the invention will appear upon reading the detailed description below of non-limiting examples of embodiment, and analyzing the attached drawings, in which.

DETAILED DESCRIPTION

The drawings and description below contain elements that can not only help the present invention to be better understood, but can also contribute to its definition, where appropriate.

In the present description, it will be considered that a panel comprises one or more bifacial modules, a bifacial module comprises one or more bifacial cells that each comprise at least two stacked junctions. The junctions of each of the cells are connected in series, the cells are interconnected in series and/or in parallel, and the modules are connected in series and/or in parallel in the panels.

The light perceived by a photovoltaic module is composed of several contributions, direct radiation, radiation scattered by the sky and radiation reflected by the environment. Naturally, the powers of these contributions vary continuously with the climate. The orientation of the module also plays a role in their powers, by enabling more or less light to access the rear face, for example.

In the present disclosure, the optimization of the tilt of a panel comprising one or more bifacial modules is carried out using measurements of the perceived light power on each face of the panel, measurements of the current produced by the panel, and modeling of the operation of the module or modules constituting the panel, and therefore the currents of the different junctions.

In particular, the present disclosure relates to cells combining several energy absorbing materials with different band gaps, i.e., cells comprising several junctions, for example p-n type junctions constituted of different semiconductor materials that are stacked and designed to produce an electrical current in response to different parts of the light spectrum, and that are connected in series.

Figure 1A:
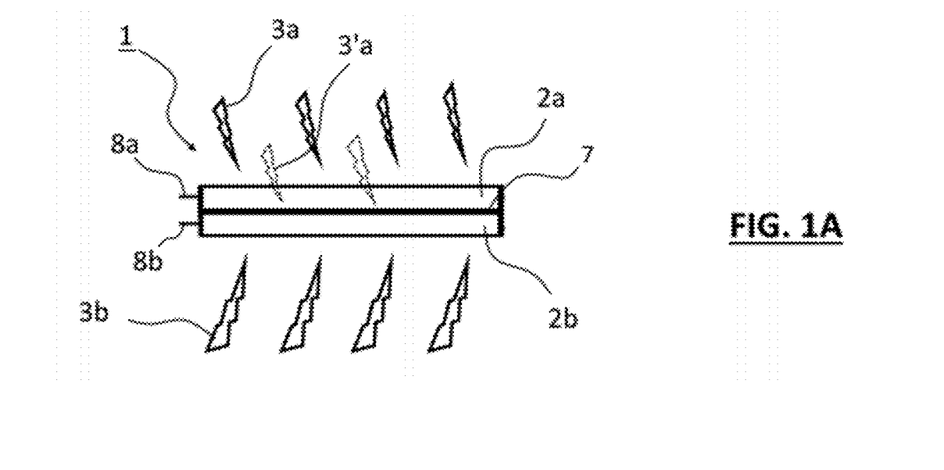
FIG. 1A and FIG. 1B show examples of a cell with several junctions.

Reference is now made to FIG. 1A, that represents a first example of a photovoltaic cell 1 designed for the method of the invention.

According to this figure, a first type of multi-junction cell, known as a bifacial tandem cell, is manufactured, this cell comprising two stacked, series-connected junctions. According to this example, the cell thus comprises an upper junction 2a that will be positioned under an upper face of a module that receives light 3a at the upper face of the module and a lower junction 2b on the lower face of the module and that receives light 3b at the lower face of the module, as well as a part of the light received at the upper face which crosses the upper junction. Such a cell is, for example, a perovskite/silicon cell.

These junctions are series-connected by a bonding 7 inside the cell and comprise two output terminals 8a, 8b.

In the context of the invention, the upper junction converts one part 3a of the wavelengths of the light that it receives and allows one part 3'a of the longer wavelengths of this light to pass to the lower junction of the module, which converts this part of the wavelengths and which also converts the light 3b arriving through the lower face of the module.

Figure 1B:
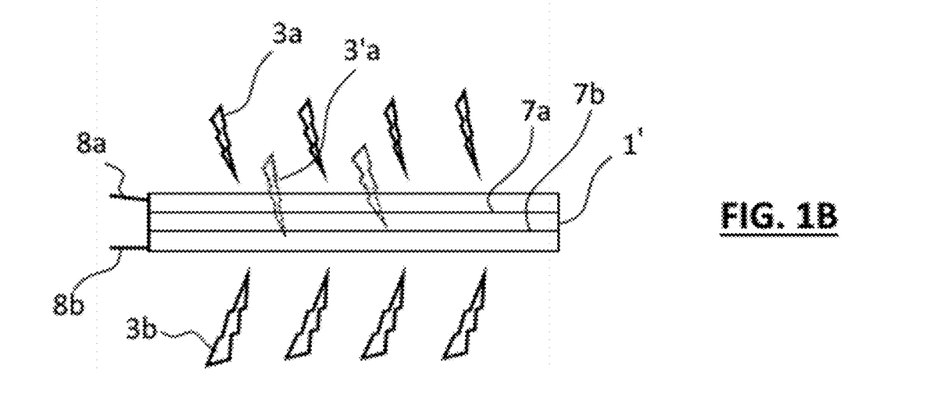

FIG. 1B relates to a second type of photovoltaic cell 1' designed for the method of the invention. According to this embodiment, cell 1' comprises three or more junctions. The junctions are constituted of layers in different semiconductor materials converting the light with increasing wavelengths from an upper face of the cell to a lower face of the cell. These junctions are series-connected 7a, 7b inside the cell and the cell comprises two output terminals 8a and 8b. The junction on the lower face is designed to convert one part of the incident light crossing the upper layers and to convert the light at the lower face 3b arriving through the lower face of a module in which the cell is located. An example of such a cell is a cell of the Ill-V triple junction type or a Ill-V multi-junction cell on a Si junction.

The object of the method described below is to optimize the current of the photovoltaic panels comprising one or more photovoltaic modules with bifacial multi-junction cells. According to this method, the tracking is adjusted to maximize and balance the currents of the stacked, series-connected junctions in the cells or the assemblies of cells according to the irradiance at the upper face and at the lower face.

Figure 2:
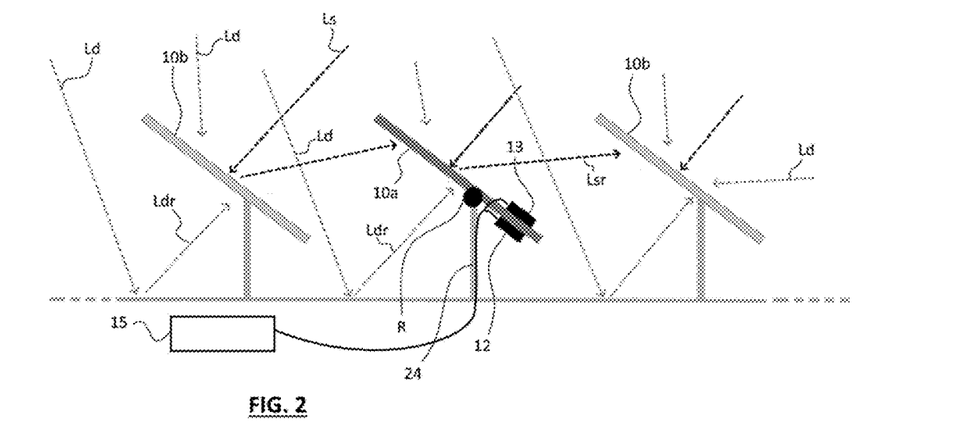
FIG. 2 shows a detail of an example of a solar field.

The tracking system according to the present disclosure is presented in FIG. 2 on a bifacial photovoltaic panel 10a comprising one or more bifacial modules according to the present disclosure. The tracking system is composed of a panel fixation structure, comprising a frame 24 and an axis of rotation R, the panel being tilted by a motorization controlled by a tracking computer 15 around the axis R, one or more sensors 12 at the lower face of the panel and one or more sensors 13 at the upper face of the panel to measure the power of the light radiation received on each of the faces of the panel. The structure on which the panel is fixed may be the same as for a conventional tracking system. The structure may be mobile on one or two axes, FIG. 2 representing an example of tracking in azimuth at one degree of freedom, the tracking system may also have two degrees of freedom for height tracking of the sun. Sensors 12 and 13 are connected to the tracking computer 15 that will adjust the angular position of the module by pivoting it around the axis R by means of a servo motor according to the irradiances at the upper face and at the lower face, as will be seen below.

Rays of light arriving directly from the sun Ls, scattered by the sky Ld, reflected on the ground Ldr, and reflected on the adjacent panels Lsr are received at the front faces and rear faces of the panels. Other contributions, not represented to not overload the figure, are possible, such as rays of light reflected by the front face of the panels and arriving at the rear face of the modules of other panels.

Still according to the example from FIG. 2, several bifacial panels 10b are slaved to the tracking device of a bifacial panel 10a provided with sensors 12, 13. Other configurations are possible as to the number of slaved panels in relation to the panels provided with the tracking device, particularly depending on the shading situations according to the position of the panels.

Figure 3A:
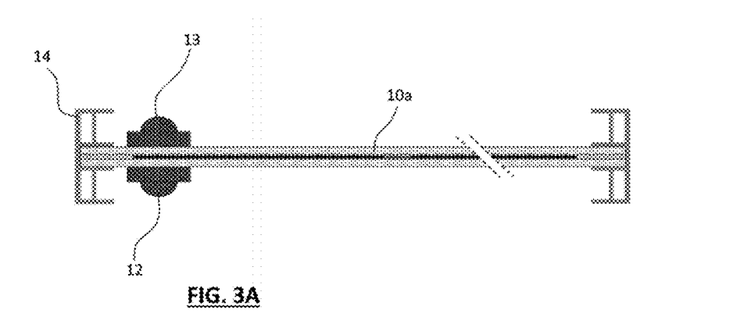
FIG. 3A diagrams a module designed for the method of the present disclosure, the juxtaposition of which with other modules forms a panel.

FIG. 3A represents an example of the implantation of sensors 12 at the lower face and 13 at the upper face of a module 10a disposed in a support 14. The implantation of sensors may particularly be adjusted to limit or eliminate the risk of the sensors being located in a shaded area of the module according to the angular position of the module in azimuth. The module is a module in which the juxtaposition with other modules forms a panel.

Figure 3B:
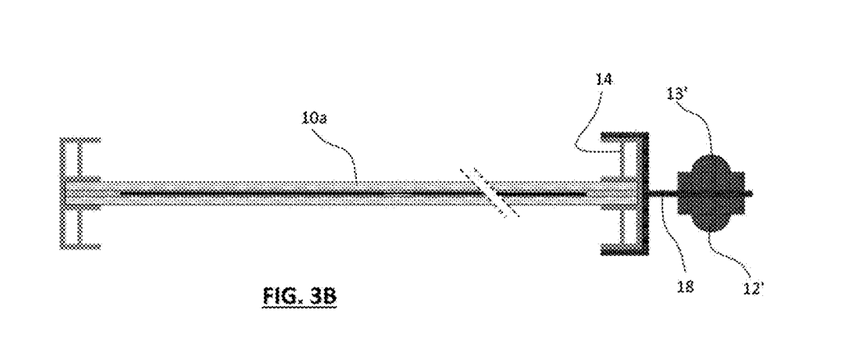
FIG. 3B diagrams a variation of FIG. 3A.

FIG. 3B represents a variation where the lower 12' and upper 13' sensors are disposed outside the support 14 on an arm 18 fixed to an edge of the support 14 to prevent the creation of a shaded area on the modules. The sensors may, according to this embodiment, be fixed on two opposed edges of the support or on the four edges of the support.

Figure 4:
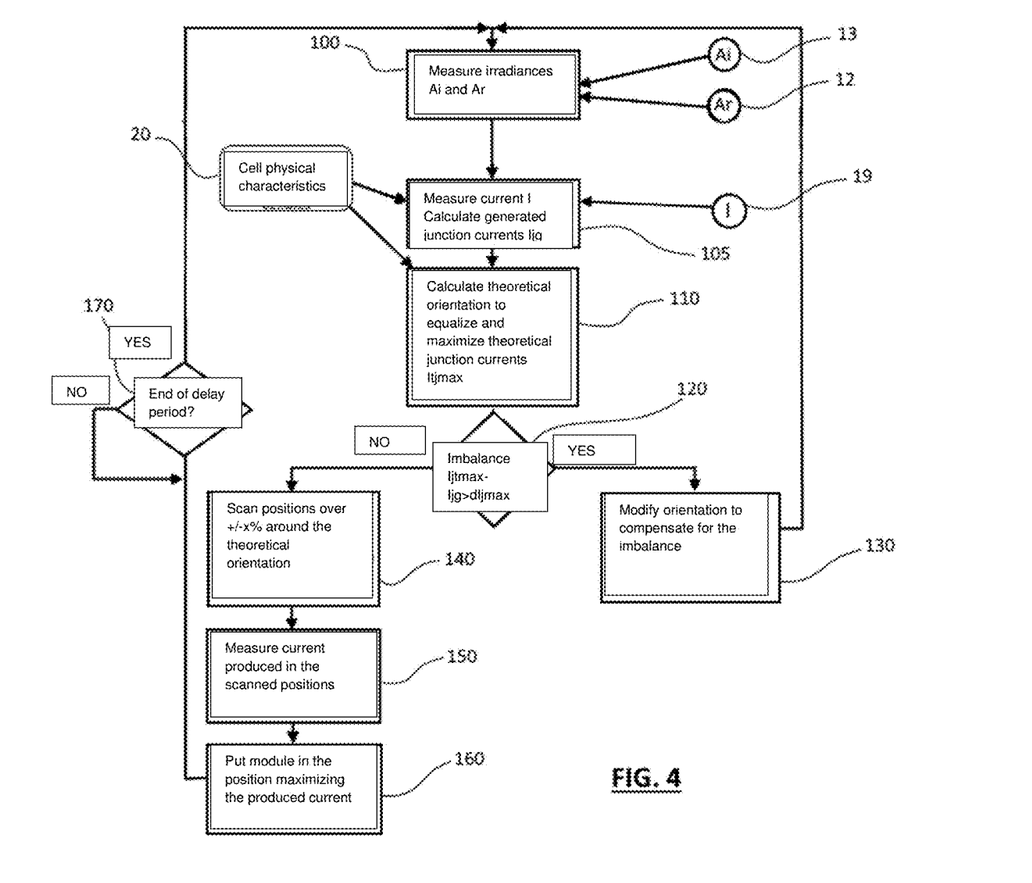
FIG. 4 shows an example of a logic diagram according to one embodiment of the present disclosure.

FIG. 4 is a logic diagram detailing the possible steps of a method for maximizing the current produced by tracking the orientation of a panel comprising at least one bifacial photovoltaic module, itself comprising a plurality of juxtaposed cells, each provided with at least two stacked and series-connected junctions, according to the present disclosure.

The method is designed for a device for driving the orientation of a panel that is able to be oriented with respect to the sun, the panel comprising one or more modules, but is also designed for a device for driving a plurality of panels slaved together on a same axis or on different axes.

This method principally comprises an algorithm comprising:

a. measuring 100 the incident irradiance Ai on an upper photoactive face of said panel and measuring the reflective irradiance Ar on a lower photoactive face of said panel in an initial orientation of the panel. These measurements are carried out by means of one or more sensors 13 at the upper face of the module measuring the power of the incident light radiation and one or more sensors 12 at the lower face of the panel measuring the power of the reflected radiation;

b. By means of a current sensor 19 for example, measuring 105 the initial current I produced by the module in response to the measured upper face Ai and lower face Ar irradiances and calculating the currents Ijg generated by said stacked junctions according to the physical characteristics of the cells 1 and said initial current, c. calculating 110 an optimized theoretical orientation for which, knowing the measured upper face Ai and lower face Ar irradiances, the generated currents and the physical characteristics 20 of the cells 1, an equalization of theoretical currents Ijtmax of the junctions is obtained, which enables the generated currents to be maximized.

d. positioning the panel in said theoretical orientation in the case where an imbalance between said theoretical currents Ijtmax and said generated currents Ijg is greater than a threshold value dIjmax or maintaining the position of said solar module in the case of a difference in current between said theoretical currents and said generated currents of less than said threshold value.

Choosing or setting the threshold value can be carried out during the system implementation tests to retain stability of the automatic control that the method constitutes, while offering sufficient precision. The chosen threshold value will, in particular, depend on the precision of the tracking system and the illumination conditions of the panels. A threshold value such as a relative deviation of 10% or even 5% between said theoretical currents Ijtmax and said generated currents Ijg may be given as an idea, this value possibly being refined during implementation of the system.

The method may be applied to modules alone, panels grouping together one or more modules and each assembled on a frame, or several panels themselves grouped together on a same frame.

The physical characteristics of the cells necessary for the calculations comprise the efficiency of the different junctions composing them according to the sunlight irradiance and comprise the value of the band gap of the absorbent materials of the junctions composing the cells. This data corresponds to the knowledge of the portion of the light spectrum attributed to each junction. An additional characteristic necessary for the calculations is the efficiency of each junction in its own spectral band. Additional data, such as the temperature response and the efficiency for different illumination powers, can be used for more costly but more precise calculations.

For calculating the generated theoretical current, the perceived spectral irradiance, directly measured using the sensors mentioned above, is converted into photon flux according to the formula:

$$\phi(\lambda) = I(\lambda)\frac{\lambda}{hc} \quad [\text{Math. 1}]$$

with $\phi(\lambda)$ the spectral photon flux ($s^{-1} \cdot nm^{-1} \cdot m^{-2}$), $I(\lambda)$ the spectral irradiance ($W \cdot m^{-2} \cdot nm^{-1}$), $\lambda$ the wavelength (nm), h the Planck constant ($6.62 \cdot 10^{-34}$ J·s) and c the speed of light ($2.99 \cdot 10^8$ m·s$^{-1}$).

The photon flux in the limited spectral zone of each junction is then converted into theoretical current according to the formula:

$$I_{jtmax} = qS \int_0^{+\infty} \phi(\lambda) \cdot A_j(\lambda) d\lambda \quad [\text{Math. 2}]$$

With $I_{jtmax}$ the theoretical current produced by the junction j (A), q the elementary charge ($1.60 \cdot 10^{-19}$ A·s), S the surface of the junction (m$^2$), and $A_j(\lambda)$ the spectral absorption of the junction j (without units).

$A_j(\lambda)$ is the absorption of the junction j in its spectral zone: it may be defined in a more or less elaborate manner according to the level of knowledge of the junctions and their efficiency.

As the irradiances are dependent on the orientation of the module, the starting tilt of the module may be the tilt issued from a conventional solar tracking calculation.

To refine the positioning of the module, when the imbalance between said theoretical currents Ijtmax and said generated currents Ijg is less than said threshold value dIjmax, a scan 140 of the positions of the module around the theoretical position obtained may be carried out. During the scan, a measurement 150 of the current produced by the module in each of said positions is then carried out to enable a step 160 of placing the module in the position maximizing the current produced by the module.

The method may comprise a test step enabling the implementation of said algorithm if an imbalance between the irradiance at the upper face and the irradiance at the lower face of the panel is less than a threshold D, because a too-great difference between such irradiances may not be compensated.

Figure 5:
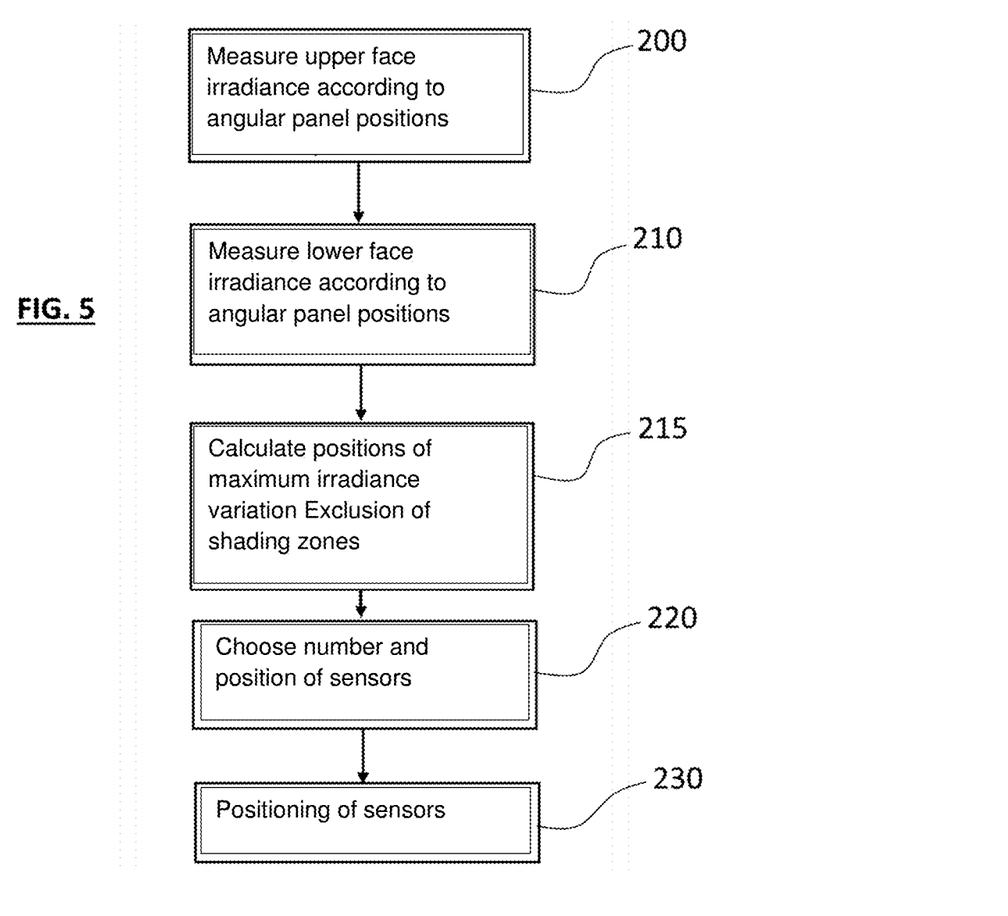
FIG. 5 represents the steps prior to the positioning of sensors.

In order to prevent possible shading phenomena, the method may comprise, prior to the implementation of the panel or panels, during implantation of said panels, one or more prior steps of choosing the number of sensors 220 and positioning 230 the sensors on the panel or panels.

One or more upper sensors 13 and one or more lower sensors 12 are respectively disposed on said upper face and said lower face of the panel, the number and positioning of the upper and lower sensors will be adjusted according to the shading conditions and the uniformity of the perceived light on and under the panel according to several tilts of the panel, to generate irradiance data appropriate for the calculation of said theoretical orientation.

The positioning and number of sensors may, in particular, be determined by irradiance measurements at the upper face 200 according to several angular positions of the panel, particularly in azimuth, and by an irradiance measurement at the lower face 210, still according to several angular positions of the panel. However, these measurements presuppose the prior installation of provisional sensors. These measurements may be used to find the best compromise between shade and obtaining the data necessary for the algorithm determining the optimal orientation of the panel.

The steps of positioning 230 sensors for measuring irradiance may, in particular, comprise a calculation 215 for positioning sensors at areas with the highest irradiation variations with exclusion of shading zones according to the orientation of the panel.

FIGS. 6A to 6D give examples of embodiment of panels in top view comprising 15 modules 31, 32, designed for the method and provided with sensors 13.

Figure 6A:
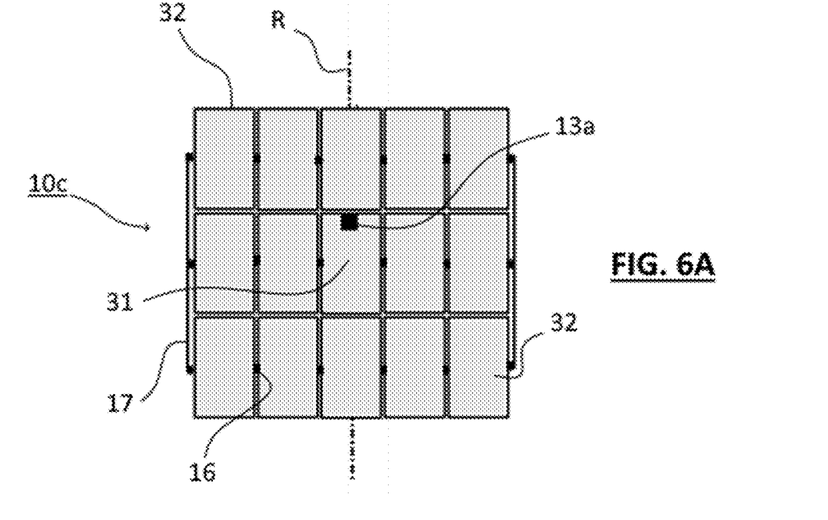
FIG. 6A, FIG. 6B, FIG. 6C and FIG. 6D show examples of the positioning of sensors on panels with one or more modules according to the embodiments.

FIG. 6A represents an example of a panel 10c that comprises three rows of five modules 31, 32 in which the modules of each row are connected in series by bondings 16 and the rows are connected in parallel by bondings 17.

This panel comprises a pair of sensors with a sensor 13a above the panel, here on modules 31 in a central area of the panel, and a sensor, not visible in the figure, below the module. This embodiment is the most economical but only enables irradiances in the central part of the panel to be measured, modules 32 lacking sensors.

Figure 6B:
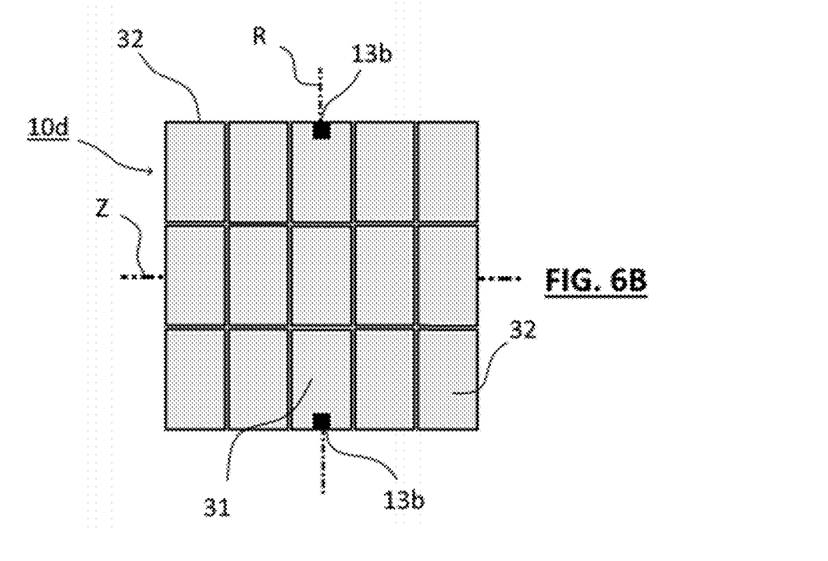

In FIG. 6B, panel 10d comprises two pairs of sensors, along the axis of rotation Z of the panel on modules 31 on opposed edges of the panel, with two sensors 13b above the panel and two sensors below the panel, not visible in the figure. This embodiment enables the shading caused by the sensors in the central part of the panel of the embodiment from FIG. 6A to be reduced and improves the irradiance variation measurements associated with the tracking at zenith (axis of rotation Z), whether it is the only tracking axis or not.

Figure 6C:
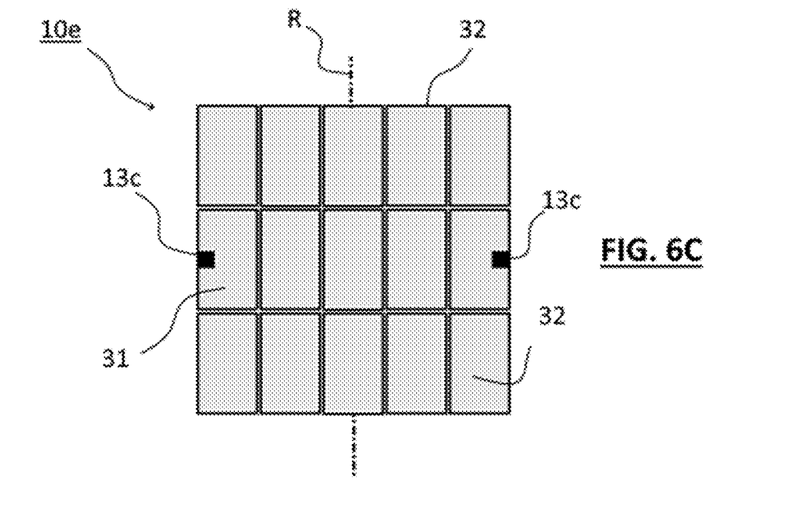

In FIG. 6C, the panel also comprises two pairs of sensors including sensors 13c and sensors, not represented, symmetrical with sensors 13c in relation to the plane of the panel. This time, these pairs of sensors are disposed on modules 31 at a central axis of the panel, perpendicular to the axis of rotation R of the panel at azimuth, on two edges of the panel. This disposition enables the measurement during a tracking at azimuth to be improved.

Figure 6D:
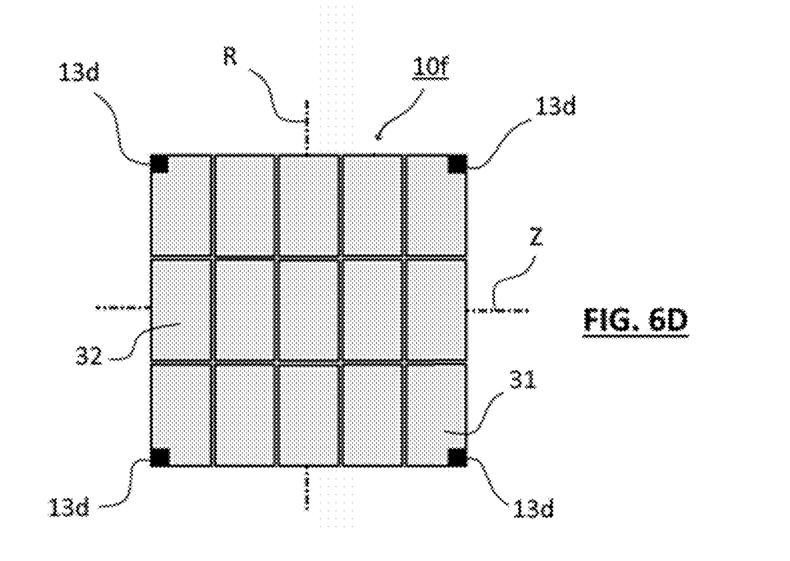

Lastly, in FIG. 6D, a solution with four pairs of sensors 13$d$ on modules 31 at the corners of the panel 10$f$ enables the variations in azimuth along the axis R and in zenith along the axis Z to be understood. This solution offers greater precision of irradiance measurements, but at a higher cost, and requires a more powerful computer.

A solution with sensors 12', 13' outside the support 14 as represented in FIG. 3B is also possible to eliminate the shading due to the sensors on the panel.

Figure 7A:
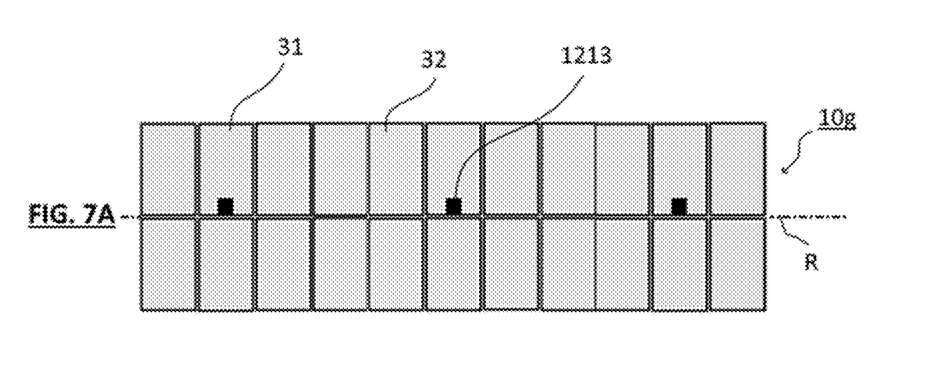
FIG. 7A, FIG. 7B and FIG. 7C represent alternative solutions of the positioning of sensors on the panels.
Figure 7B:
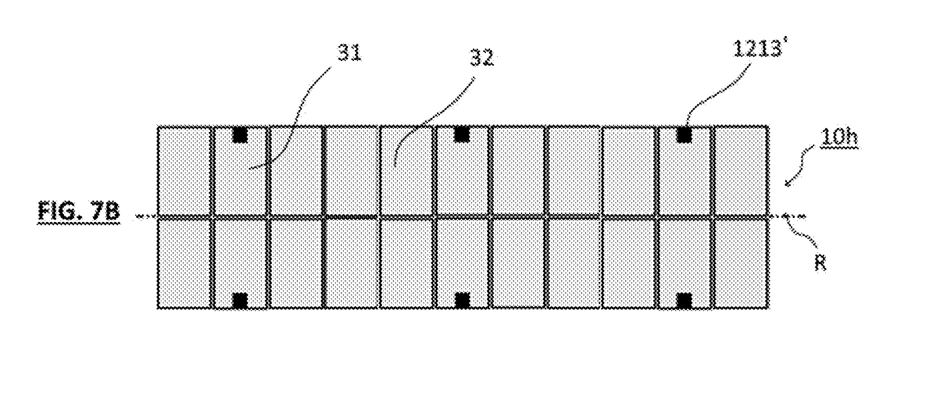
Figure 7C:
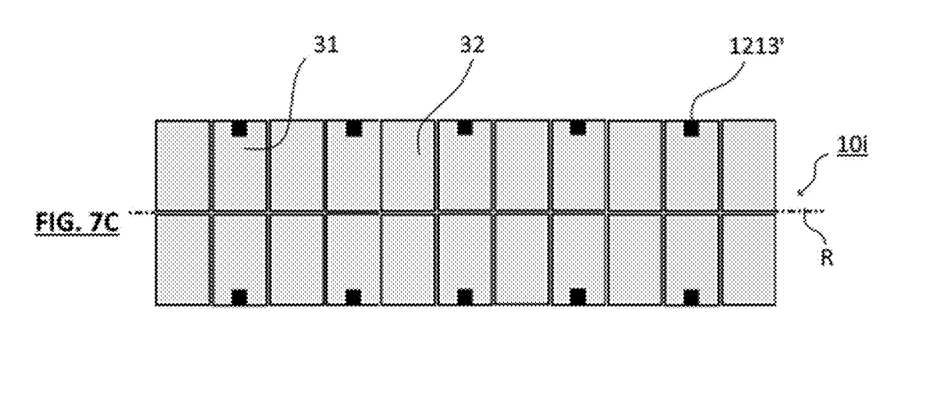

Examples of implantation of sensors on multi-module panels are given in FIGS. 7A to 7C where the panels group, for example, 22 modules together.

In FIG. 7A, pairs of top, bottom sensors 1213 are aligned along a longitudinal axis R of the panel 10$g$ and are distributed between modules 31, modules 32 remaining without pairs of sensors.

FIG. 7B proposes a more elaborate positioning in which the pairs of sensors 1213' are placed at areas with the highest irradiance variations according to the orientation of the panel 10$h$ and on some modules 31. As in FIG. 7A, the perceived irradiance on the other modules 32 may be interpolated.

FIG. 7C corresponds to an embodiment similar to FIG. 7B but with a finer resolution, i.e., in which a higher number of modules 31 are provided with pairs of sensors 1213.

A solution similar to the embodiments of FIGS. 6B, 6C, 6D, 7B and 7C, in which the sensors are fixed to a support of one module or several modules placed on an edge of the panel, is also possible according to the embodiment of FIG. 3B.

The positions and numbers of sensors may be adjusted according to the shading conditions encountered during the installation of panels for the operation of a solar power plant, and the modules may comprise a different number of cells 1 connected in series or in parallel.

The invention is not limited to the embodiments described above, only by way of example, but the invention encompasses all the variations that the person skilled in the art may envisage within the scope of the desired protection and, in particular, the sensors may be disposed on or at the periphery of the modules and/or panels, their positions being adjustable according to the possible shading conditions encountered.

The invention claimed is:

1. A method for maximizing a current produced by a photovoltaic panel comprising one or more bifacial photovoltaic modules, said one or more bifacial photovoltaic modules comprising a plurality of cells, each provided with at least two stacked and series-connected junctions, the photovoltaic panel being able to be oriented and comprising a device for driving an orientation of the photovoltaic panel with respect to the sun, wherein the method comprises at least:

measuring a front face irradiance Ai on an upper photoactive face of said panel and measuring a rear face irradiance Ar on a lower photoactive face of said panel in an initial orientation of said panel, measuring an initial current I produced by the panel in response to the front face irradiance Ai and rear face irradiance Ar and calculating currents Ijg generated by said at least two stacked and series-connected junctions on a basis of physical characteristics of the cells, said initial current I, said front face irradiance Ai and rear face irradiances Ar, calculating an optimized theoretical orientation for which, knowing said front face irradiance Ai and rear face irradiance Ar measured, the currents Ijg generated by said at least two stacked and series-connected junctions, and the physical characteristics of the cells, equalization of a theoretical currents Ijtmax of said at least two stacked and series-connected junctions of the cells is obtained, and positioning the panel in said theoretical orientation in the case where an imbalance between said theoretical currents Ijtmax and said generated currents Ijg is greater than a threshold value dIjmax or maintaining a current position of said panel in the case of a difference in current between said theoretical currents Ijtmax and said generated currents Ijg of less than said threshold value.

2. The method according to claim 1, comprising, when the imbalance between said theoretical currents Ijtmax and said generated currents Ijg is less than said threshold value dIjmax, scanning positions of the panel around the theoretical position obtained, measuring the current produced by the panel in each of said positions, and a step of placing the panel in a position maximizing the current produced by the panel.

3. The method according to claim 1, wherein the measurement of an irradiance at the upper photoactive face is carried out by one or more upper sensors towards said upper photoactive face of the panel and one or more lower sensors-towards said lower photoactive face of the panel, said method comprises steps prior to implementation of the panel comprising a step of choosing the number of said one or more upper sensors and said one or more lower sensors and a step of positioning said one or more upper sensors and said one or more lower sensors according to shading conditions and uniformity of light perceived above and below the panel according to several tilts of the panel, so as to generate irradiance data appropriate for the calculation of said theoretical orientation.

4. The method according to claim 3, wherein said prior steps comprise a positioning of said one or more upper sensors and said one or more lower sensors at areas of the panel with the highest irradiance variations exclusive of shade, according to an orientation of the panel.

5. A photovoltaic panel, configured for an implementation of a method for maximizing a current produced by a photovoltaic panel comprising one or more bifacial photovoltaic modules, said one or more bifacial photovoltaic modules comprising a plurality of cells, each provided with at least two stacked and series-connected junctions, the photovoltaic panel being able to be oriented and comprising a device for driving an orientation of the photovoltaic panel with respect to the sun, wherein the method comprises at least:

measuring a front face irradiance Ai on an upper photoactive face of said panel and measuring a rear face irradiance Ar on a lower photoactive face of said panel in an initial orientation of said panel, measuring an initial current I produced by the panel in response to the front face irradiance Ai and rear face irradiance Ar and calculating currents Ijg generated by said at least two stacked and series-connected junctions on a basis of physical characteristics of the cells, said initial current I, said front face irradiance Ai and rear face irradiance Ar, calculating an optimized theoretical orientation for which, knowing said front face irradiance Ai and rear face irradiance Ar measured, the currents Ijg generated by said at least two stacked and series-connected junctions, and the physical characteristics of the cells, equalization of a theoretical currents Ijtmax of said at least two stacked and series-connected junctions of the cells is obtained, and positioning the panel in said theoretical orientation in the case where an imbalance between said theoretical currents Ijtmax and said generated currents Ijg is greater than a threshold value dIjmax or maintaining a current position of said panel in the case of a difference in current between said theoretical currents Ijtmax and said generated currents Ijg of less than said threshold value, wherein said photovoltaic panel comprises one or more of said bifacial photovoltaic modules, the cells of which are bifacial multi-junction cells in which junctions of said bifacial multi-junction cells are connected in series.

6. The panel according to claim 5, wherein the cells of the bifacial photovoltaic modules are interconnected along a series-parallel network.

7. A computer program comprising instructions for implementing a method for maximizing a current produced by a photovoltaic panel comprising one or more bifacial photovoltaic modules, said bifacial photovoltaic modules comprising a plurality of cells, each provided with at least two stacked and series-connected junctions, the panel being able to be oriented and comprising a device for driving an orientation of the photovoltaic panel with respect to the sun, wherein the method comprises at least:

(a) measuring a front face irradiance Ai on an upper photoactive face of said panel and measuring a rear face irradiance Ar on a lower photoactive face of said panel in an initial orientation of said panel, (b) measuring an initial current I produced by the panel in response to the front face irradiance Ai and the rear face irradiance Ar and calculating a currents Ijg generated by said stacked and series-connected junctions on a basis of physical characteristics of the cells, said initial current, front face irradiance Ai and rear face irradiance Ars, (c) calculating an optimized theoretical orientation for which, knowing said measured front face irradiance Ai and the rear face irradiance Ar, the currents Ijg, and the physical characteristics of the cells, an equalization of a theoretical currents Ijtmax of the stacked and series-connected junctions of the cells is obtained, and (d) positioning the panel in said theoretical orientation in the case where an imbalance between said theoretical currents Ijtmax and said currents Ijg is greater than a threshold value dIjmax or maintaining a position of said panel in the case of a difference in current between said theoretical currents Ijtmax and said currents Ijg of less than said threshold value when this program is executed by a processor.

8. The program according to claim 7, comprising further instructions to provide scanning positions of the panel around the theoretical orientation obtained, measuring the current produced by the panel in each of said positions, and a step of placing the panel in a position maximizing the current produced by the panel, when the imbalance between said theoretical currents Ijtmax and said currents Ijg is less than said threshold value dIjmax.

9. The program according to claim 7, comprising further instructions to provide prior to implementation of the panel:

a step of choosing the number of said one or more upper sensors and said one or more lower sensors, a step of positioning said one or more upper sensors and said one or more lower sensors according to shading conditions and uniformity of light perceived above and below the panel according to several tilts of the panel, so as to generate irradiance data appropriate for the calculation of said theoretical orientation when the measurement of an irradiance at the upper photoactive face is carried out by one or more upper sensors towards said upper photoactive face of the panel and one or more lower sensors towards said lower photoactive face of the panel.

10. The program according to claim 9, wherein said prior steps comprise a positioning of the one or more upper sensors and the one or more lower sensors at areas of the panel with highest irradiance variations exclusive of shade, according to an orientation of the panel.

11. A non-transitory computer-readable recording medium, on which the program according to claim 7 is recorded.

12. A device for producing energy, comprising a plurality of photovoltaic panels that comprise one or more bifacial photovoltaic modules, said modules comprising a plurality of cells, each being provided with at least two stacked and series-connected junctions associated with one or more frames provided with solar tracking systems, at least some of the photovoltaic panels comprising one or more irradiance sensors at front and rear faces of said panels, the device also comprising a tracking computer connected to said one or more irradiance sensors, said computer being configured to execute a program comprising instructions for implementing a method for maximizing a current produced by said photovoltaic panels comprising said one or more bifacial photovoltaic modules, the panels being able to be oriented and comprising a device for driving an orientation of said panels with respect to the sun, wherein the method comprises at least:

(a) measuring a front face irradiance Ai on an upper photoactive face of said panels and measuring a rear face irradiance Ar on a lower photoactive face of said panels in an initial orientation of said panels, (b) measuring an initial current I produced by the panels in response to the front face irradiance Ai and rear face irradiance Ar and calculating currents Ijg generated by said stacked and series-connected junctions on the basis of physical characteristics of the cells, said initial current, said front face irradiance Ai and said rear face irradiances Ar, (c) calculating an optimized theoretical orientation for which, knowing said front face irradiance Ai and said rear face irradiance Ar, the currents Ijg, and physical characteristics of the cells, equalization of theoretical currents Ijtmax of the junctions of the cells is obtained, and (d) positioning the panel in said theoretical orientation in the case where an imbalance between said theoretical currents Ijtmax and said currents Ijg is greater than a threshold value dIjmax or maintaining a position of said panel in the case of a difference in current between said theoretical currents and said currents Ijg of less than said threshold value and to drive the position of said plurality of photovoltaic panels by means of said tracking systems so as to balance and maximize the currents of the junctions of the cells issued from the front face irradiance Ai and rear face irradiance Ar received by said panels.

13. The device for producing energy according to claim 12, wherein said irradiance sensors are associated by pairs of irradiance sensors at the upper photoactive face and at the lower photoactive face on one or more of said panels and are disposed along a median positions on said panels, a peripheral positions on said panels, or around said panels.

14. The device for producing energy according to claim 12, wherein the cells of said one or more bifacial photovoltaic modules are interconnected along a series-parallel network.

* * * * *